United States Patent
Clappier

[11] Patent Number: 5,535,440
[45] Date of Patent: Jul. 9, 1996

[54] FM RECEIVER ANTI-FADING METHOD AND SYSTEM

[76] Inventor: Robert R. Clappier, 910 Lido Cir., Discovery Bay, Calif. 94514

[21] Appl. No.: 370,820

[22] Filed: Jan. 10, 1995

Related U.S. Application Data

[63] Continuation of Ser. No. 595,402, Oct. 11, 1990, abandoned.

[51] Int. Cl.⁶ .................................................. H04B 7/08
[52] U.S. Cl. ...................................... 455/134; 455/277.2
[58] Field of Search ........................... 455/134, 136, 455/138, 140, 234, 273, 133, 135, 272, 277.1, 277.2, 278.1, 132; 370/69.1; 381/13, 4; 375/347; 327/419

[56] References Cited

U.S. PATENT DOCUMENTS

| | | | |
|---|---|---|---|
| 1,950,123 | 3/1934 | Ohl | 455/140 |
| 2,551,805 | 8/1951 | McDonald . | |
| 3,729,682 | 4/1973 | Elder . | |
| 3,794,926 | 2/1974 | Skingley et al. . | |
| 3,986,124 | 10/1976 | Mitchell, Jr. . | |
| 4,035,728 | 7/1977 | Ishikawa et al. | 455/134 |
| 4,255,816 | 3/1981 | Grunza et al. | 455/136 |
| 4,355,419 | 10/1982 | Hiyama . | |
| 4,450,585 | 5/1984 | Bell . | |
| 4,539,710 | 9/1985 | Dinsmore | 455/134 |
| 4,633,519 | 12/1986 | Gotoh et al. | 455/134 |
| 4,641,367 | 3/1987 | Van Deursen et al. . | |
| 4,742,563 | 5/1988 | Fukumura | 455/136 |
| 4,756,023 | 7/1988 | Kojima | 455/134 |
| 4,823,398 | 4/1989 | Hashimoto | 455/140 |
| 4,942,622 | 7/1990 | Takayama et al. | 455/33 |
| 4,969,207 | 11/1990 | Sakamoto et al. | 455/134 |

FOREIGN PATENT DOCUMENTS

| | | | |
|---|---|---|---|
| 0027444 | 2/1983 | Japan | 455/272 |
| 0063241 | 4/1983 | Japan | 381/13 |
| 0237530 | 10/1986 | Japan | 455/272 |

*Primary Examiner*—Reinhard J. Eisenzopf
*Assistant Examiner*—Nguyen Vo
*Attorney, Agent, or Firm*—Howard L. Rose

[57] ABSTRACT

Two FM receivers with a common audio output each with its own antenna located six to fifteen feet apart are provided for a moving vehicle together with a switching circuit that in response to the AGC signal sensed at the output of the multiplex adapter of each receiver selects a first receiver if the AGC of that receiver is of greater amplitude than a threshold signal or the amplitude of the AGC signal of the other receiver.

5 Claims, 4 Drawing Sheets

FM RECEIVER ANTI-FADING METHOD AND SYSTEM

This is a continuation of application Ser. No. 07/595,402, filed on Oct. 11, 1990 now abandoned.

BACKGROUND OF THE INVENTION

The present invention relates to a method and system for substantially eliminating fading of the audio output signal of mobile FM receivers and more particularly to the use of two FM receivers each with its own antenna, a common audio output channel and means for switching the audio output channel between receivers as a function of the relative strengths of the AGC signals of the two receivers.

Mobile FM receivers, particularly those mounted in motor vehicles are subject to signal fading as the vehicle moves from place to place. This problem is particularly noticeable in regions having many tall buildings or in areas remote from the station being received. Such phenomena is particularly noticeable when listening to music having large audio amplitude output ranges.

OBJECT OF THE INVENTION

It is a primary object of the present invention to provide a method or system for substantially reducing fading in FM mobile receivers as the receivers are moved from place to place.

It is another object of the present invention to provide a pair of FM receivers each with its own antenna and a common audio output section with means for switching the audio output section as a function of the relative strength of the AGC signals developed by the individual receivers.

It is still another object of the present invention to provide at least two FM receivers and a single audio output channel downstream of the multiplex adapters with switching of the audio output channel to receive the output of one or the other of the multiplex adapters as a function of the amplitudes of the AGC signals produced by the audio detectors of the receivers.

It is yet another object of the present invention to prevent fading of the audio output signals of an FM receiver system by providing two FM receivers and a single audio output channel with a specific priority for selection of one receiver over the other as a function of the amplitudes of the AGC signals of the receivers.

BRIEF DESCRIPTION OF THE PRESENT INVENTION

The present invention is based on two basic premises. First that if the antennas of the two receivers are spaced 6 to 15 feet apart, they will receive r.f. signals traversing different or less cluttered paths and as a result differences in signal strengths can be detected. Second that if switching transients are not to be generated at audible levels, switching must occur after the stereo multiplex adapter.

Referring to the first basic premise, it is essential for proper operation of the system that the two antennas not be subjected at all times to essentially the same r.f. signals. Testing has shown that a separation of 6 feet to 15 feet is sufficient in most instances to subject the antennas to signals of sufficiently different fading patterns even in areas of tall buildings and other clutter and in fringe areas, to permit selection of one signal as better than the other..

The second basic premise is that switching between receivers must not produce audible transients and that such can be accomplished only if switching between receivers occurs after the stereo multiplex adapter. In theory, switching can occur anywhere in the receivers but low frequency signals are easier to switch than high frequency signals. Switching could, therefore, be easily accomplished anywhere in the audio section; that is, anywhere after the audio detectors. Switching between the audio detector and the multiplex adapter requires only a simple single pole double throw electronic switch. This approach cannot be used, however, since the multiplex adapter takes time to lock onto a signal and, therefore, audible transients would be produced. Thus, the switching position has been chosen downstream of the multiplex adapters. Such location requires a double pole, double throw electronic switch.

A specific discipline has been established for switching between receivers. A first receiver is selected as the preferred receiver. If the AGC signal of the detector of the first receiver is above a predetermined threshold, the audio output of that detector is used. If the AGC signal of the first receiver is below the aforementioned threshold but is of greater amplitude then the corresponding signal of the other receiver, the first receiver audio output signal is again selected. Only if the AGC signal of the first receiver is below the established threshold and is of lower amplitude than the other receiver does switching occur. Restated, the philosophy is to use the signal of the first receiver as long as it is good enough. In a recent test where thresholds were set at a desired level, switching occurred 435 times in about a 25 feet distance without any detectable change in audio output amplitude and without any sounds produced by switching.

DETAILED DESCRIPTION OF THE PRESENT INVENTION

Figure 1:
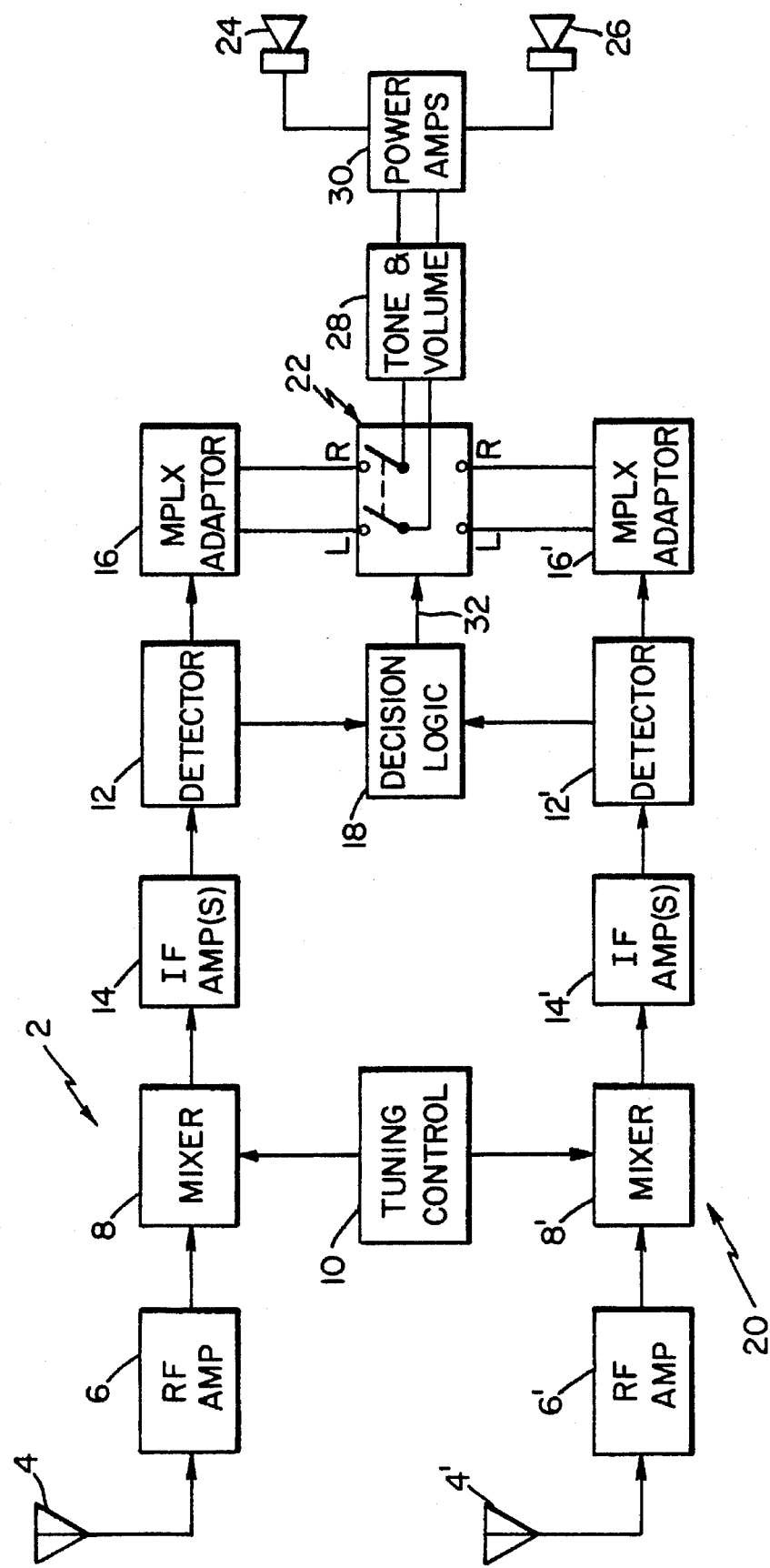
FIG. 1 is a block diagram of the system of the present invention.

Referring now specifically to FIG. 1 of the accompanying drawings, there is illustrated a block diagram of the system of the present invention. A first receiver generally designated by reference numeral 2 is provided with an antenna 4 feeding signals to an r.f. amplifier 6 the output of which is provided to a mixer 8. A tuning control 10 is employed to tune the receiver 2 to a desired station. The output of the mixer 8 is supplied to an audio detector 12 via an I.F. amplifier 14. The audio output signal from the detector 12 is supplied to a multiplex adapter 16 while an AGC signal produced by the detector 12 is supplied to a decision logic circuit 18.

A second receiver 20 is also provided and includes all of the same elements as the receiver 2, the elements of the receiver 20 bearing the same reference numerals as receiver 2 but with primes. The tuning control 10 controls tuning of both of the mixers 8 and 8' so that the receivers are always tuned to the same station.

Each of the multiplex adapters provide left and right channel audio signals to a double pole double throw switch 22 that supplies signals from a selected channel to output speakers 24 and 26 via tone and volume control 28 and power amplifier 30.

Figure 2:
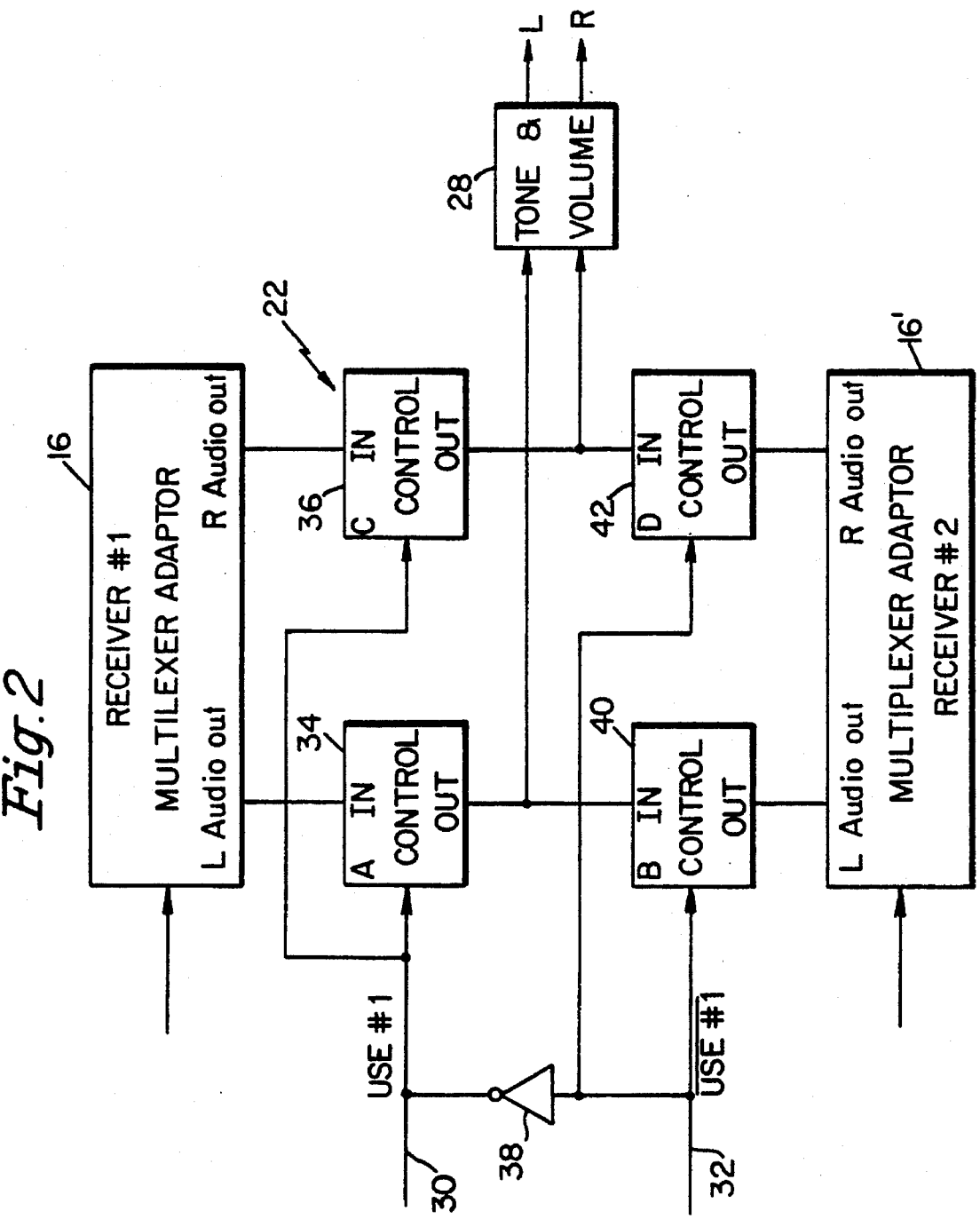
FIG. 2 is a block diagram of the double pole double throw switch employed in FIG. 1.

A block diagram of the double pole double throw switch 22 is illustrated in FIG. 2 of the accompanying drawings. The switch 22 employs four CMOS switches. Two of the switches are connected to receive the left and right channels of the same receiver and are "on" while the two connected to the other receiver are "off." A "Use #1" signal appears on output lead 32 of the decision logic 18 and is supplied via inverter 38 as a "Use #1" signal to CMOS switches 34 and 36 connected to multiplex adapter 16. The $\overline{\text{Use #1}}$ signal is supplied to CMOS switches 40 and 42 connected to multiplex adapter 16'. The inverter 38 is illustrated here only for purpose of understanding and does not exist in the final circuit as will become apparent subsequently. If the "$\overline{\text{Use #1}}$" signal on lead 32 becomes a "Use #1" then the switches 40 and 42 are enabled. The reason for this apparent reversal of functions becomes apparent when the decision logic 18 is discussed. The CMOS switches are included in a single DIP, for instance, an MC74HC4066 by Motorola.

Figure 3:
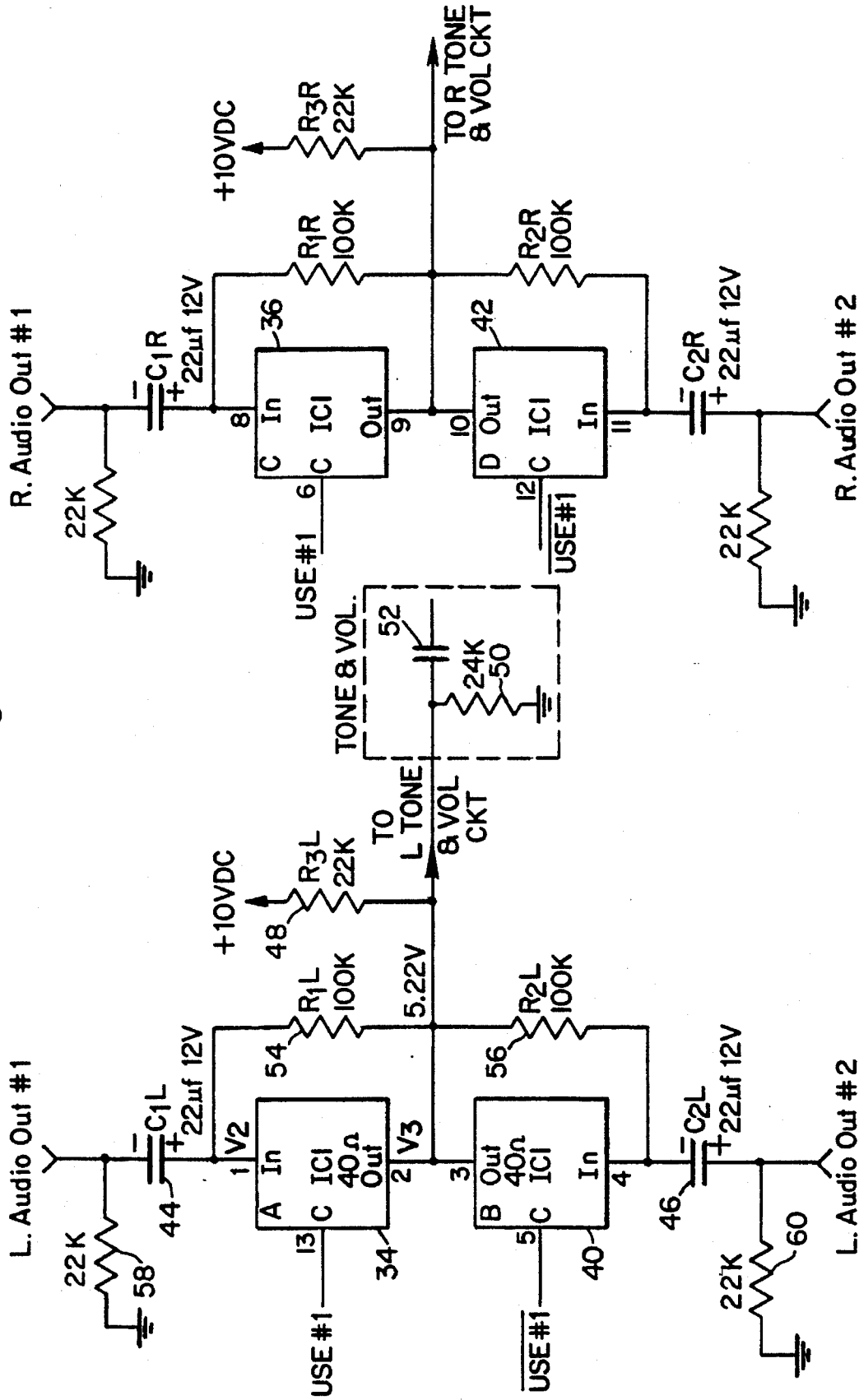
FIG. 3 is a detailed circuit diagram of one-half of the switching circuit of FIG. 2.

Referring to FIG. 3 of the accompanying drawings, details of the biasing and dc blocking circuits of the switch 22 are illustrated. Although well designed FM receivers produce quite similar audio amplitude signals the dc voltages may vary by as much as a volt and, therefore, blocking capacitors 44 and 46 are employed and resistors 48, 50, 54 and 56 are employed to establish the operating voltages of the CMOS switches. The CMOS switches employed cannot operate and may be destroyed by voltages of 16 volts which are found in some vehicles. In the present embodiment of the invention, the system operating voltage is established and stabilized at 10 volts for safety and convenience.

Because of their small size, electrolytic capacitors are used for capacitors 44 and 46, but in order to operate properly they must have a dc voltage across them. To provide such a bias, a voltage divider consisting of resistors 48 and 50 is provided with resistor 48 being 22K ohms and resistor 50 being 24K ohms. This latter resistor, resistor 50 in the drawing, is found in the tone and volume control section of the receivers used, Sony Model ES-R11, as is coupling capacitor 52. Resistors 48 and 50 establish the voltage at the junction of resistors 54 and 56 and at the junction of the capacitors 44 and 46 and CMOS switches 34 and 40, respectively. Thus the capacitors are biased by about half a volt. Also, the resistance of resistors 54 and 56 must be much greater (roughly 10 to 1000 times greater) than the "on" resistance of the switches to prevent bleed through of the unwanted signal. The capacitors 44 and 46 are 22 μF and resistors 58 and 60 are 22K ohms. These latter resistors are required by the receivers used, to properly bias the AM-to-FM switching diodes.

Figure 4:
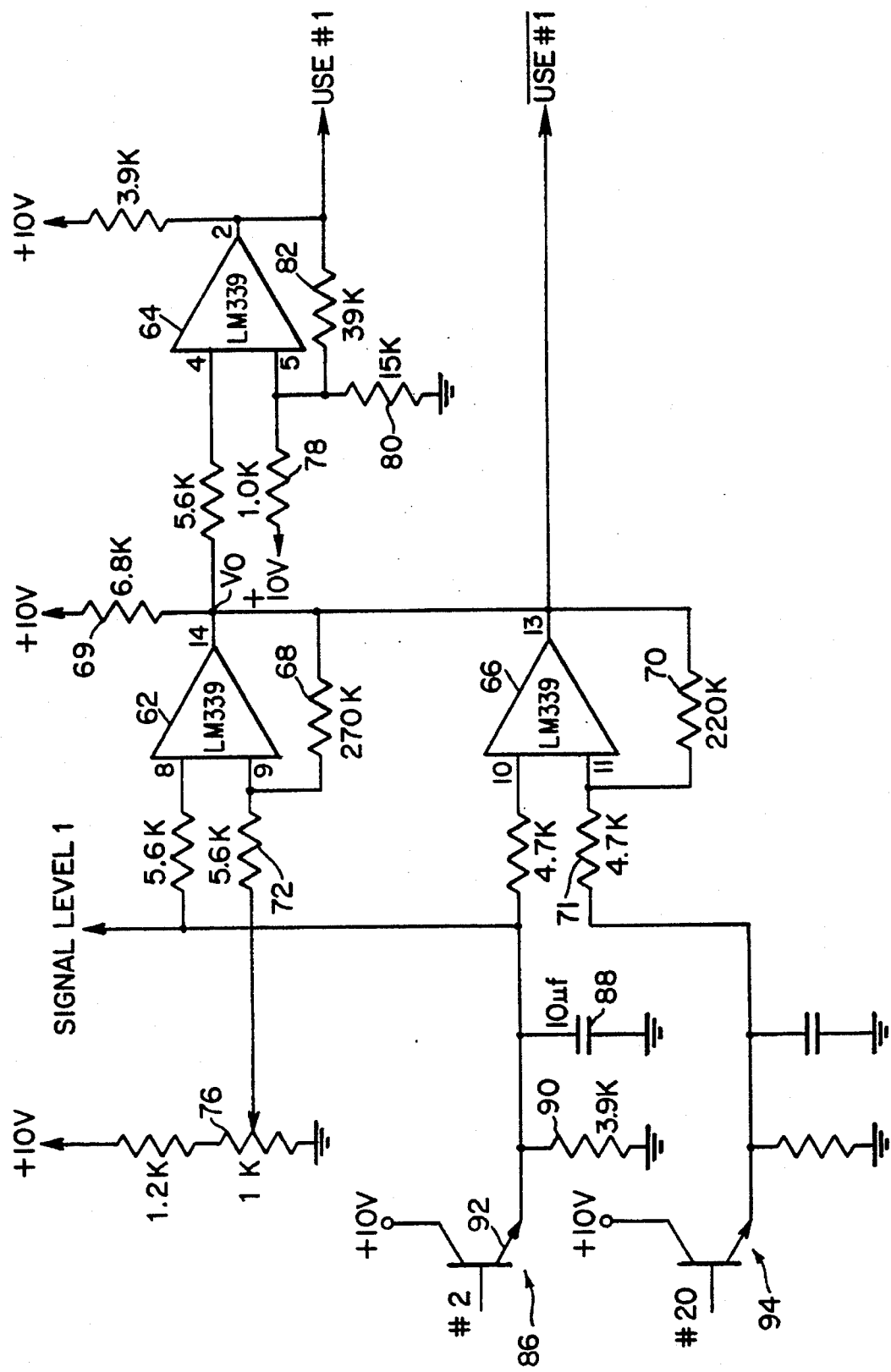
FIG. 4 is a circuit diagram of the switching drive circuit of the present invention.

Referring now to FIG. 4, there is illustrated the circuit diagram of the decision logic 18 of FIG. 1. The decision logic employs an LM339 chip available from a number of companies including National Semiconductor. The chip contains four comparators, three of which are employed in the decision logic circuit 18.

The logic used herein is a reverse logic, that is, a low output signal is employed to indicate that the AGC signal of the preferred receiver is above a desired threshold. The comparators are wired as Schmitt Triggers which use positive feedback to change the decision threshold whenever a decision is made whereby hysteresis is built into the decision logic.

In FIG. 4 the three comparators bear reference numerals 62, 64 and 66 with the threshold voltage applied to pin 9 of comparator 62, with the comparison, AGC, signal from the receiver 20 applied to pin 11 of comparator 66. The comparison, AGC, signal from receiver 2 is applied to pins 8 and 10 of comparators 62 and 66 while the output voltage of comparator 62 is applied to pin 4 of comparator 64. Feedback resistors 68 and 70 of comparators 62 and 66, respectively, are employed to provide hysteresis in conjunction with resistors 72 and 74. Threshold voltage to comparator 62 is provided from a potentiometer 76 so that the switch voltage of comparator 62 may be adjusted. The potentiometer 76 is employed to permit the threshold voltage to be adjusted as required.

The feedback via resistor 68 to the pin 9 of comparator 62 in conjunction with resistor 72 sets up a voltage control circuit in which the voltage at pin 9 is above or below the voltage from the potentiometer depending upon whether the output voltage $V_o$ of comparator 62 is low or high. If the voltage on pin 8 is high compared with the voltage on pin 9 then the output is low and the voltage on pin 9 is below the threshold voltage. Conversely, if the voltage on pin 8 is low compared with the voltage on pin 9, the output is high and the voltage on pin 9 is above the threshold voltage thus building hysteresis into the system.

As an example only of the above, if the threshold voltage is +3 V, resistor 72 is 1K, resistor 68 is 10K, then the voltage on pin 9 is 2.73 volts when $V_o$=0. Thus if the signal level from the receiver 2 is greater than 2.73 volts $V_o$ remains low. If the AGC voltage from receiver 2 goes below 2.73 volts, the comparator switches and $V_o$=10 volts. The voltage at pin 9 is now 3.64 volts. The voltage on pin 8 must now rise above 3.64 volts to cause comparator 62 to switch again.

The comparators employed are LM339 which have very high input impedances and thus their input impedances may be ignored in the above calculations. Also, the LM339 requires an external pull-up resistor which allows several outputs to be tied together and the overall output is low if any one of the outputs is low. This feature is important in the logic used as will become apparent.

In the actual device as illustrated in FIG. 4 the circuits produce a voltage on the slide of the potentiometer of between 0 and 4.5 volts. The actual voltage employed in the test described in the Brief Description of the Invention was 2 volts although this voltage may vary with location.

As previously indicated in FIG. 3 when the AGC level is above the threshold voltage applied to comparator 62 the output is low and the signal $V_o$ produced at the junction of resistor 68 and pull up resistor 69 is $\overline{\text{Use #1}}$. An inverter is required to produce the signal Use #1 and a further comparator, comparator 64, is employed for this purpose. The pin 5 of comparator 64 is connected to 10 V through resistor 78 and the junction of resistor 78 and pin 5 is tied to a reference potential (preferably ground) through a resistor 80 and to the comparator 64 output via a resistor 82. The resistor 82 is tied to output pin 2 of the comparator 64 which provides the Use #1 signal when the signal $V_o$ is low. Although not illustrated pin 12 of the comparators is tied to ground and pin 3 is tied to 10 volts.

The comparator 66 is employed to compare the signals produced by the two receivers 2 and 20. The AGC signal produced by receiver 2 is applied to pin 10 and the AGC signal of receiver 20 is applied to pin 11 of comparator 66. The output signal is produced at the junction of resistor 70 and pull up resistor 69. As indicated above, the output of receiver 2 is utilized unless, its AGC level is below the threshold applied to comparator 62 and the level on pin 11 of comparator 66 is higher than the signal on pin 10. If both of these conditions exist the output of both comparators 62 and 66 will be high and the $\overline{\text{Use \#1}}$ signal is produced. Conversely, if the AGC output signal of receiver 2 is above its threshold or its level is above the level produced by receiver 20, the output voltage of at least one of comparators 62 and 66 is low. As a result of using a common pull up resistor 69, the signal $V_o$ is low and the output voltage of comparator 64 is high, Use #1.

The AGC signals of the Sony ES-R11 receivers used on the initial tests have some audio signal mixed in with the AGC signals and therefore these signals are not suitable for the decision logic even with hysteresis built in. To eliminate the audio noise a low pass filter would normally be employed. A low pass filter is not suitable, since if it is capable of eliminating the audio from the AGC, it reduces bandwidth of the decision logic to an unacceptable level; a level that is not suitable to switch receivers quickly enough to achieve the intended purpose of the invention.

The above problem is solved by using peak detecting circuits at the input to the comparators 62 and 66. The peak detectors are identical and each comprises an emitter follower 86 that quickly charges a capacitor 88 to the peak of the envelope of the AGC signal level output and a parallel resistor 90 to discharge the capacitor quite slowly so that the peak detector can follow rapid increases in the AGC signal. The emitter follower 86 charges the capacitor 88 quickly as the signal level rises while the resistor 90 discharges the capacitor slowly as the signal level falls, a true peak detector function.

The output signal from receiver 2 is applied to emitter follower 86 and the signal produced at emitter 92 of the follower 86 is applied to pin 10 of comparator 62. The output signal of a second emitter follower 94 is applied to pin 11 of comparator 66, the emitter follower 94 receiving input from receiver 20. Thus both comparators receive essentially noise free signals upon which suitable switching can be achieved.

More than two receivers may be employed wherein a hierarchy is established such that a first receiver is employed if its AGC signal is above its threshold or greater than the AGC signal of any other receiver, a second receiver is employed if its AGC signal is above its threshold and above the AGC signal of any other receiver so long as the first receiver is not above its threshold and so on.

Many variations and modifications of the above-described embodiments are within the ordinary skill of the skilled artisan in this art, without departing from the scope of the invention. Accordingly, those modifications and embodiments are intended to fall within the scope of the invention as defined by the following claims.

I claim:

1. A system for reducing audio output signal fading in FM receivers intended to be transported to various locations while in use comprising a first FM receiver having a multiplex adapter, a second FM receiver having a multiplex adapter, means for concurrently tuning both said FM receivers to the same radio station and maintaining them turned on, an audio output circuit, a switch circuit for switching said audio output circuit between first and second receivers downstream of the multiplex adapters in response to signal strengths produced by said FM receivers relative to each other and to a threshold voltage, said switch circuit including at least a first and a second switch each having an input terminal, each switch connected to receive on its input terminal the audio output signal from a different one of said receivers, and a network for establishing essentially identical dc biasing voltages on said input terminals.

2. A system for reducing fading in mobile FM receivers according to claim 1 further comprising a circuit in each said receiver for producing an AGC signal, a circuit for establishing a threshold voltage, a first comparator comparing the AGC signal of the first receiver with the threshold voltage and for producing a first signal when the AGC signal is greater than the threshold voltage, a second comparator for comparing the AGC signals of both receivers and producing a second signal when said AGC signal of the first receiver is the larger amplitude signal, said switch circuit switching the audio output circuit to receive audio signals from said first FM receiver in response to receipt of said first or said second signal, said switch circuit switching the audio output circuit to receive audio signals from the second FM receiver if neither of the first nor the second signal is received, said comparators are Schmitt triggers having two output leads with feedback to their inputs, and a common pull-up resistor for both said Schmitt triggers connected directly to said two output leads.

3. A system for reducing fading in mobile FM receivers according to claim 2 further comprising means for applying one of said AGC signals to one of said Schmitt triggers, and means for producing maximum voltage across said pull-up resistor, said means including said Schmitt trigger for producing a flow output voltage when said AGC signal applied to one of its said inputs is greater than the voltage applied to the other of its inputs an inverter for producing a high output voltage in response to a maximum voltage developed across said pull-up resistor.

4. A system for reducing fading in mobile FM receivers according to claim 1 wherein said network includes an electrolytic capacitor, and means for providing a voltage bias across said capacitors.

5. A system for reducing fading in mobile FM receivers according to claim 4 wherein said network is a resistor-capacitor further including a resistor divider for establishing said bias.

* * * * *